United States Patent [19]

Mead et al.

[11] Patent Number: 5,616,157
[45] Date of Patent: Apr. 1, 1997

[54] VISIBLE RESTRICTED FILTER INDICATOR

[75] Inventors: Donald R. Mead; Deborah V. Beebe, both of Jupiter, Fla.

[73] Assignee: Florida Pneumatic Manufacturing Co., Jupiter, Fla.

[21] Appl. No.: 557,274

[22] Filed: Nov. 14, 1995

[51] Int. Cl.⁶ .................................................. B01D 46/00
[52] U.S. Cl. ...................... 55/274; 55/DIG. 34; 116/268; 116/272; 116/283; 116/DIG. 25
[58] Field of Search ............................. 55/274, DIG. 34; 95/25; 116/268, 272, 281, 283, DIG. 25, DIG. 42

[56] References Cited

U.S. PATENT DOCUMENTS

| | | |
|---|---|---|
| 2,878,936 | 3/1959 | Scavuzzo et al. . |
| 2,935,040 | 5/1960 | Steensen ................................. 116/268 |
| 2,954,751 | 10/1960 | Barnes, Jr. . |
| 3,011,470 | 12/1961 | Stoermer ................................. 116/268 |
| 3,028,009 | 4/1962 | Scavuzzo et al. . |
| 3,064,618 | 11/1962 | Scavuzzo ................................. 116/268 |
| 3,068,831 | 12/1962 | Witchell ................................. 55/274 |
| 3,094,969 | 6/1963 | Whiting . |
| 3,103,952 | 9/1963 | Whiting . |
| 3,117,550 | 1/1964 | Cole ........................................ 116/272 |
| 3,119,367 | 1/1964 | Barnes, Jr. et al. ..................... 116/268 |
| 3,125,063 | 3/1964 | Hultgren . |
| 3,128,743 | 4/1964 | Whiting . |
| 3,150,633 | 9/1964 | Holl . |
| 3,332,279 | 5/1967 | Kasten . |
| 3,377,980 | 4/1968 | Schindel . |
| 3,379,206 | 4/1968 | Whiting ................................. 116/268 |
| 4,142,503 | 3/1979 | Hatz et al. .............................. 55/274 |

*Primary Examiner*—C. Scott Bushey
*Attorney, Agent, or Firm*—Larson and Taylor

[57] ABSTRACT

A filter indicator system for indicating when air flow through a filter is restricted includes an indicator mounted in a filter assembly downstream of the filter. The indicator includes a housing having a central space, a side wall, an end wall, an end inlet in the end wall, and a side outlet. A pop-up member is located in the central space and includes a signal portion which extends adjacent the end inlet. A moving device is then used for moving the pop-up member between a non-signalling position where the signal member does not extend noticeably through the end inlet and a signalling position where the signal portion extends noticeably through the end inlet. A pressure responsive releasing mechanism in the side outlet is associated with the pop-up member for initially holding the pop-up member in the non-signalling position and preventing movement by the moving device, and for subsequently releasing the pop-up member when the suction pressure in the side outlet drops below a predetermined value relative to an ambient air pressure present in the central space. The releasing mechanism includes: (a) a clearance between the signal portion and the end inlet to conduct ambient air pressure to the central space; (b) a seal member which is subject to the ambient air pressure on one side and the suction pressure on the other side; and (c) a biasing member for biasing the seal member against movement until a predetermined suction pressure is exceeded.

17 Claims, 3 Drawing Sheets

TO COMPRESSOR

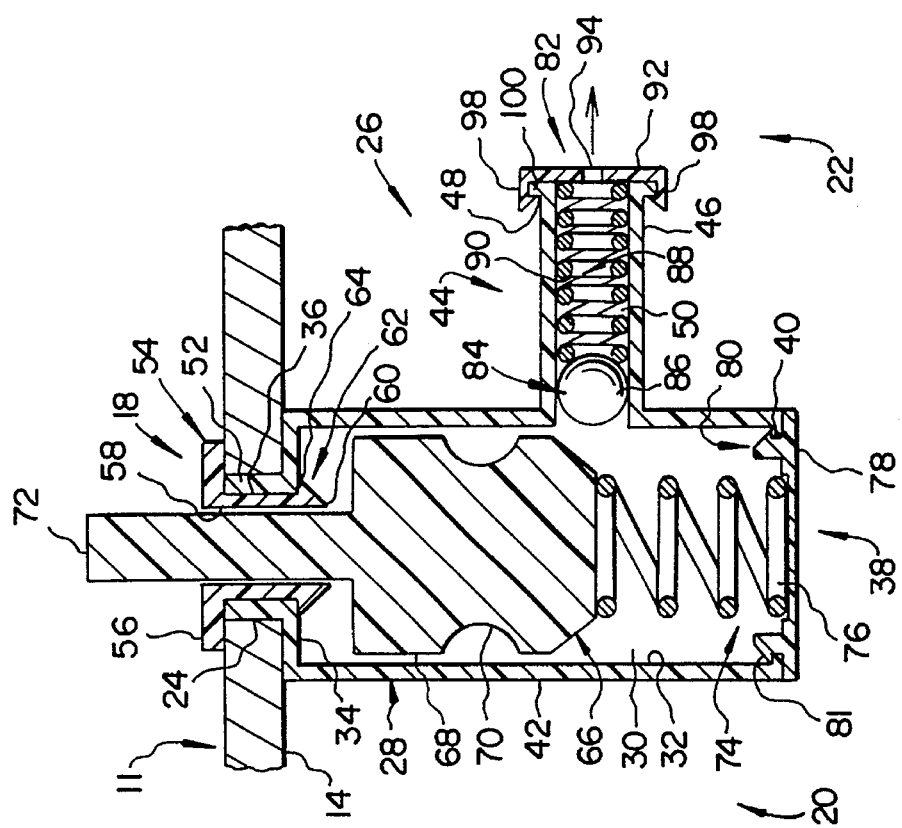
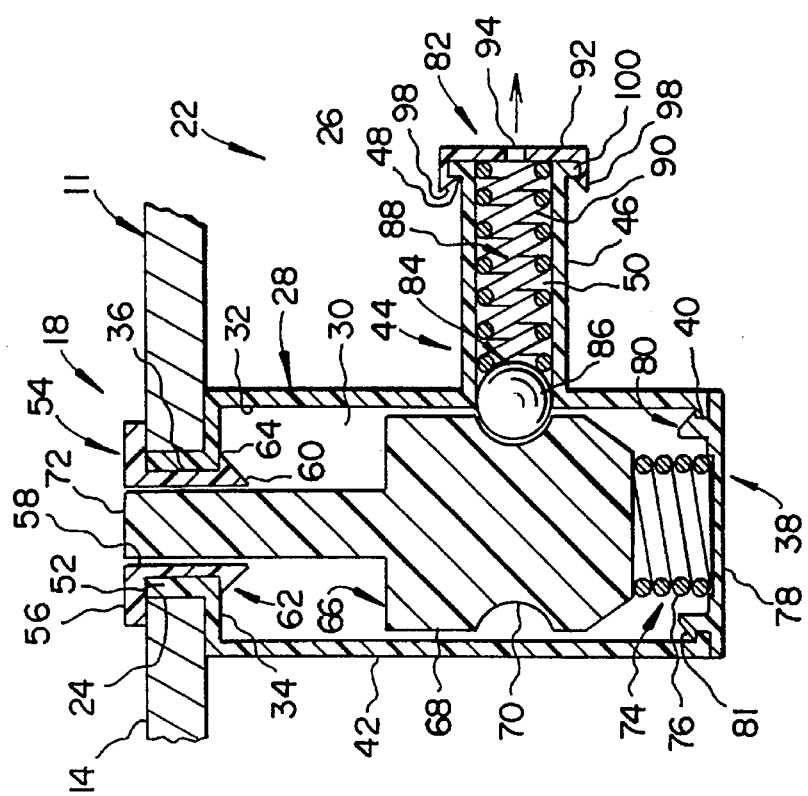
FIG. 3
FIG. 2

VISIBLE RESTRICTED FILTER INDICATOR

FIELD OF THE INVENTION

The present invention relates generally to an indicator for restricted flow through a filter, and more particularly to a visible indicator for an air filter assembly which signals when flow through the air filter is undesirably restricted.

BACKGROUND OF THE INVENTION

It is difficult when using an apparatus with an air filter, for example an air compressor, to know when to change the air filter during operation because the apparatus or compressor unit has to be shut down in order to check the filter visually. In addition, when the filter is checked visually, it is often difficult to determine the amount of dirt already trapped by the filter and whether it is time to change the filter or filter cartridge.

SUMMARY OF THE INVENTION

In accordance with the present invention, a filter indicator system is provided for indicating when air flow through a filter (or filter cartridge) is restricted. In general, the filter indicator system includes an indicator and a filter which is part of a filter assembly. The filter assembly includes a mounting wall and a means for positioning the filter in the filter assembly so that air in an inlet (upstream) portion of the filter assembly on one side of the filter (or filter wall) is drawn by a suction pressure through the filter to an intake (downstream) portion of the filter assembly on the other side of the filter (or filter wall). The filter assembly also includes a mounting aperture in the mounting wall which is downstream of the filter for mounting of the indicator.

The indicator for signalling restricted flow of air through the air filter includes a housing. The housing includes a central space, a side wall adjacent the central space, an end wall adjacent the central space, an end inlet in the end wall., and a side outlet in the side wall. A mounting means is provided for mounting the end inlet of the housing to the mounting aperture in the mounting wall located downstream of the filter, whereby the housing is mounted inside the filter assembly with the housing exposed to the suction pressure in the filter assembly which moves air through the filter. A pop-up member is located in the central space of the housing and includes a signal portion which extends adjacent the end inlet. A moving means is then used for moving the pop-up member in the housing between a non-signalling position where the signal member does not extend noticeably through the end inlet and a signalling position where the signal portion extends noticeably through the end inlet and is easily viewed above the mounting wall. A pressure responsive releasing means in the side outlet is associated with the pop-up member for initially holding the pop-up member in the non-signalling position and preventing movement by the moving means and for subsequently releasing the pop-up member when the suction pressure in the side outlet drops below a predetermined value relative to an ambient air pressure outside of the filter assembly which is also present in the central space of the housing.

In accordance with a preferred embodiment, the releasing means includes: (a) a clearance between the signal portion and the end inlet whereby the central space of the housing is subject to the ambient air pressure; (b) a seal means which fluidly restricts a flow of air from the central space of the housing to the side outlet such that the seal means is subject to the ambient air pressure on one side thereof and the suction pressure on the other side thereof; and (c) a biasing means for biasing the seal means against movement, the biasing means allowing a releasing movement of the seal means when the suction pressure drops below the predetermined value and a resetting movement of the seal means when the suction pressure rises above the predetermined value. In addition, the side outlet of the housing includes a side tube extending away from the side wall of the housing and fluidly connecting the central space of the housing with the suction pressure in the filter assembly. The pop-up member then includes a catch portion, and the seal means is a plug member such as a ball located in a cylindrical bore of the side tube adjacent the catch portion of the pop-up member when the pop-up member is in the non-signalling position so that the plug member is biased into engagement with the catch portion by the biasing means to prevent movement of the housing to the signalling position.

In the preferred embodiment, the biasing means includes a spring, a cap member, a small aperture in the cap member, and a releasable attaching means for attaching the cap member to a free end of the side tube such that the spring and the ball are held in the cylindrical bore of the side tube by the end cap but are insertable and removable from the side tube upon removal of the end cap from the free end. In addition, the mounting means includes: (a) a mounting collar upstanding from the end wall which surrounds the end inlet and extends through the mounting aperture in the assembly wall of the filter assembly; (b) a locking collar which fits inside of the mounting collar and which has a central aperture through which the signalling portion extends and an outer flange extending away from the signalling portion and resting against the mounting wall; and (c) an attaching means for attaching the locking collar to the end wall of the housing so that the mounting wall is trapped between the outer flange of the locking collar and the end wall of the housing.

Preferably, the housing is cylindrical and the central space is defined by a cylindrical wall. The pop-up member then includes a main body which is cylindrical and closely adjacent the cylindrical wall of the housing such that the main body is coaxially mounted for guided movement in the central space. The pop-up member also includes a catch portion in the main body which is engaged by the releasing means. Further, the signalling portion is cylindrical, coaxial with the main body, and extends from one end of the main body.

More preferably, the housing includes an end opposite to the end wall and an opposite end aperture in the end. The moving means then includes a spring, a seal member and a releasable seal means for attaching the cap member in the opposite end aperture of the housing opposite to the end wall to seal the opposite end aperture. With this construction, the spring is held in the housing with the spring compressed against the pop-up member by the end cap but the spring and pop-up member are insertable and removable from the housing upon removal of the end cap from the opposite end of the housing.

It is an advantage of the present invention that an indicator is provided which is inexpensively made and simple to install.

It is also an advantage of the present invention that the disclosed indicator is inexpensive to produce and easily viewed to determine when a filter in use has restricted air flow therethrough to the point where the filter should be replaced.

It is a further advantage of the present invention that the indicator can be reset and used in association with a new filter once the clogged filter has been replaced.

It is still another advantage of the present invention that the indicator is made primarily of simple and inexpensive plastic and/or metal parts and can be used in any orientation.

Other features and advantages of the present invention are stated in or apparent from detailed descriptions of presently preferred embodiments of the invention found hereinbelow.

BRIEF DESCRIPTION OF THE DRAWINGS

FIG. 2 is a cross-sectional elevation view of the indicator depicted in FIG. 1 in a non-signalling position.

FIG. 3 is a cross-sectional elevation view of the indicator depicted in FIG. 1 in a signalling position.

DETAILED DESCRIPTION OF THE PREFERRED EMBODIMENTS

Figure 1:
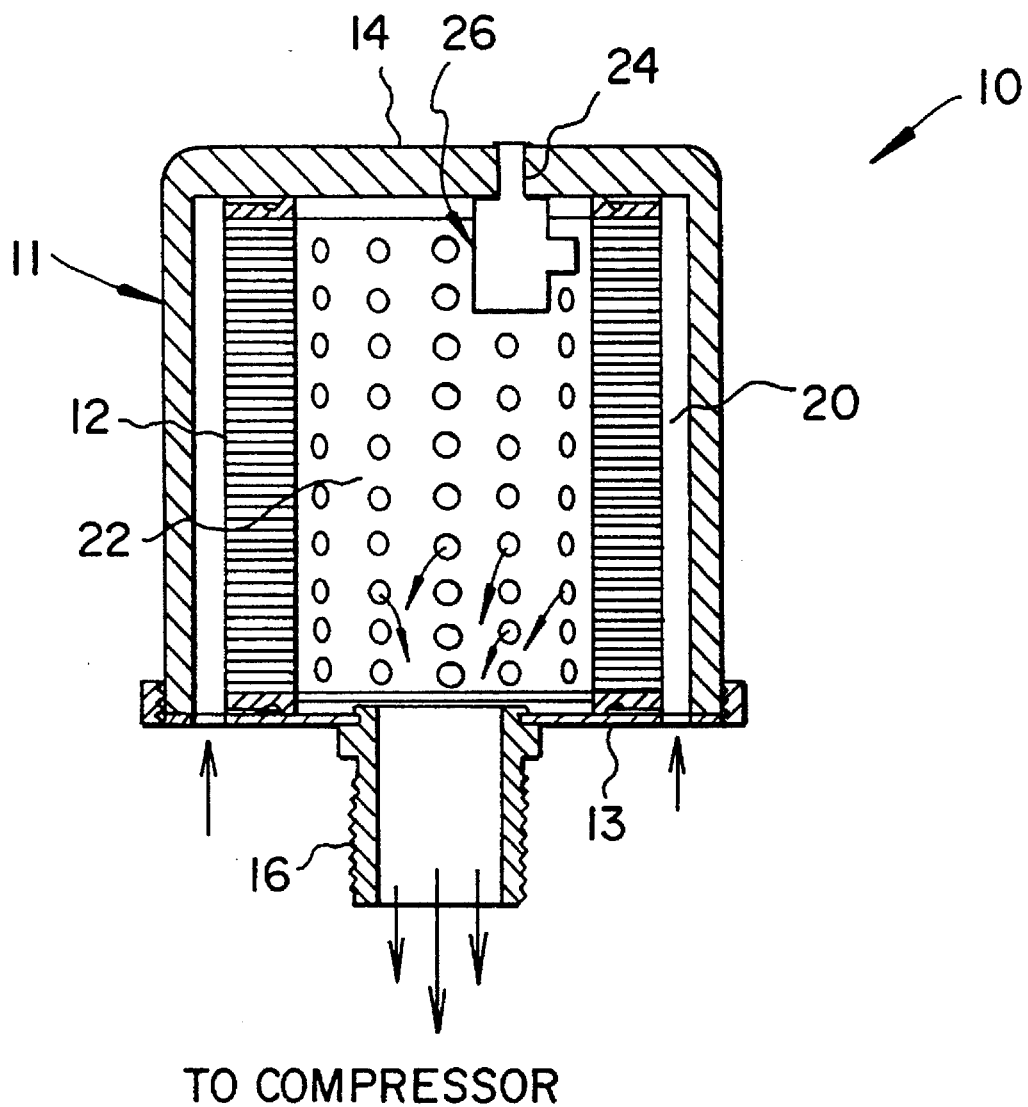
FIG. 1 is a cross-sectional elevation view of a filter system including an indicator according to the present invention.

With reference now to the drawings in which like numerals represent like elements throughout the views, a filter indicator system 10 is depicted in FIG. 1 for use with an air compressor (not shown). Filter indicator system 10 is used for indicating when air flow through a filter assembly 11 including a cylindrical filter 12 has been restricted above a certain amount, typically due to the clogging of air filter 12 with dirt or the like. As shown, filter 12 is suitably positioned in filter assembly 11 by a suitable means such as threadably engaged holding plate 13 so that filter assembly 11 is divided by cylindrical filter 12 into an inlet or upstream portion 20 outside of filter 12 and an intake or downstream portion 22 inside of filter 12 according to the air flow (depicted schematically by the arrows). This air flow is caused by the compressor or the like to which filter assembly 11 is threadably attached by mounting tube 16 extending from holding plate 13 as well known in the art. As air is drawn through filter 12, it will be appreciated that a suction pressure exists in intake portion 22, and that this suction pressure increases (actual pressure drops) as filter 12 becomes clogged and air flow through filter 12 decreases. It will also be appreciated that outside of filter assembly 11 there is an ambient air pressure. Provided at any suitable location in a mounting wall 14 of filter assembly 11 is a mounting aperture 24.

Figure 4:
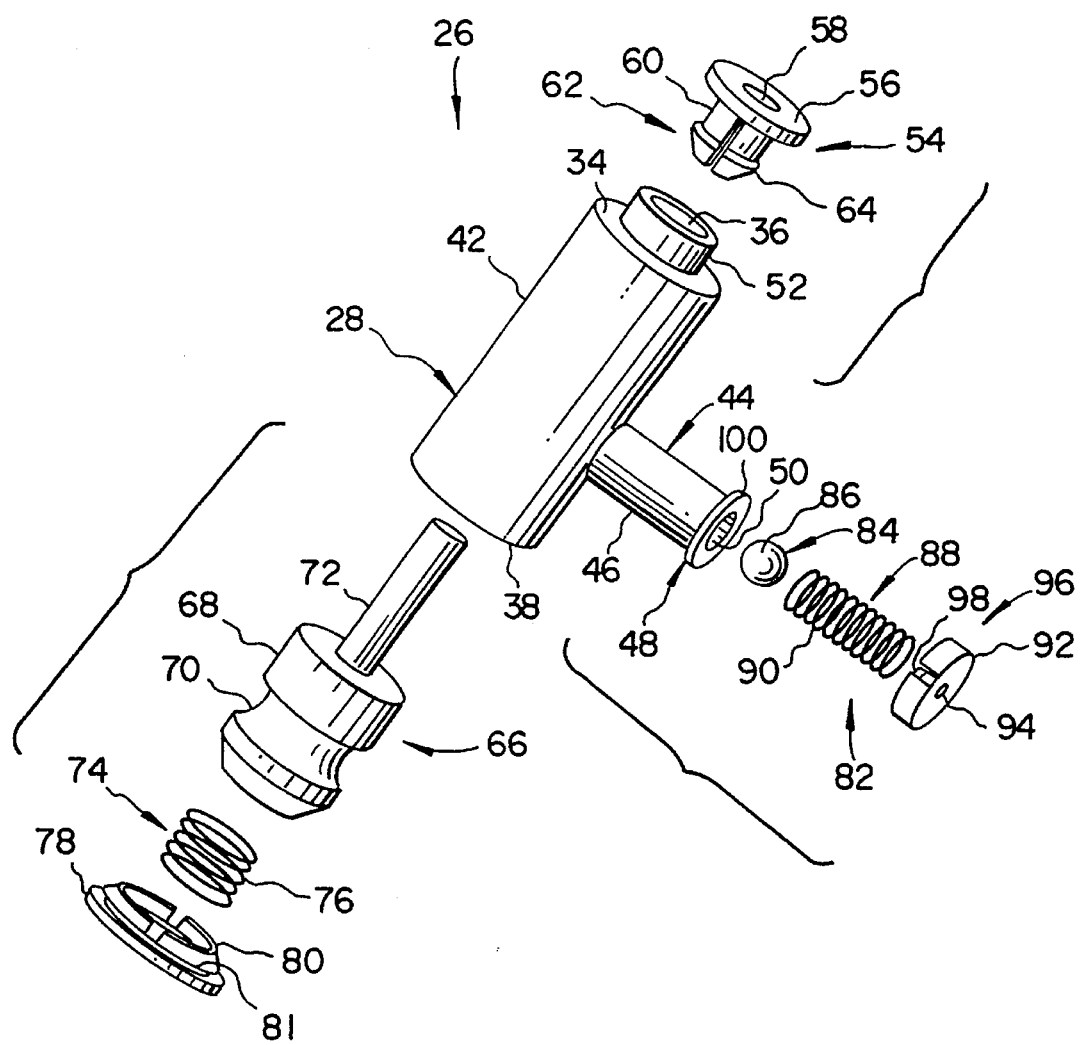
FIG. 4 is an exploded view of the indicator depicted in FIGS. 2 and 3.

Mounted in mounting aperture 24 by a mounting means 18 is an indicator 26 which is depicted in detail in FIGS. 2–4. It will be appreciated that filter assembly 11 and hence indicator 26 can be oriented in any direction besides that depicted, and the position of mounting aperture 24 by mounting wall 14 is selected for convenience. Indicator 26 includes a hollow plastic housing 28 which is preferably cylindrical. A central space 30 is provided in housing 28 which is defined by an inner cylindrical wall 32. Housing 28 also includes an end wall 34 adjacent central space 30 with an end inlet 36 therein, as well as an end 38 also adjacent central space 30 and opposite to end wall 34 with an opposite end aperture 40 therein. Extending between end wall 34 and opposite end 38 is a side wall 42 adjacent central space 30 with a side outlet 44 therein. Preferably, side outlet 44 is formed by a side tube 46 extending away from side wall 42. Side tube 46 includes a free end 48 and a cylindrical bore 50 therein which connects intake portion 22 with central space 30.

As noted above, housing 28 is mounted in mounting wall 14 of filter assembly 11 by a mounting means 18. Mounting means 18 includes a mounting collar 52 upstanding from end wall 34. Mounting collar 52 surrounds and extends end inlet 36 up through mounting wall 14 as shown in FIGS. 2 and 3. Located above and in mounting collar 52 is a plastic locking collar 54. As shown, locking collar 54 includes an outer flange 56 which extends along mounting wall 14 so that mounting wall 14 is trapped between outer flange 56 and end wall 34. Locking collar 54 also includes a central aperture 58 which is defined by a split leg portion 60. An attaching means 62 attaches locking collar 54 to end wall 34 with mounting wall 14 trapped therebetween. Attaching means 62 is conveniently a catch lip 64 formed on the outside of leg portion 60, with leg portion 60 coming to a point and being split to facilitate insertion of locking collar 54 in end inlet 36 of end wall 34. Obviously, other suitable attaching means are possible as well known in the art, such as a threaded engagement or opposed teeth which would afford the capability to trap different sizes of mounting wall 14. Still other attaching means are also possible, including other twisted engagement mechanisms, other snap locking mechanisms, screws or the like.

Provided in central space 30 of housing 28 is a plastic pop-up member 66. Pop-up member 66 includes a main cylindrical body 68 which is sized to fit closely adjacent but spaced from cylindrical wall 32 of housing 28 so that pop-up member 66 is thereby mounted for coaxial guided movement in cylindrical central space 30 of housing 28. Provided in main body 68 is a catch portion 70, which is conveniently formed as a semicircular groove. Extending away from an end of main body 66 and up through end inlet 36 is a cylindrical signalling portion 72. It will be appreciated that signalling portion 72 extends as well through central aperture 58 of locking collar 54 with a small clearance therebetween so that central space 30 of housing 28 is substantially at the ambient atmospheric pressure existing outside of filter assembly 11.

In order to move pop-up member from a non-signalling position as depicted in FIG. 2 to a signalling position as depicted in FIG. 3, a moving means 74 is provided. It will be appreciated that in the non-signalling position, the free end of signalling portion 72 is substantially flush with the outer surface of outer flange 56 of locking collar 54; while in the signalling position of FIG. 3, the free end of signalling portion 72 extends substantially above locking collar 54. If desired, signalling portion 72 is suitably colored or marked to make it easier to see or notice when signalling portion 72 is in the signalling position. Moving means 74 includes a spring 76 which is compressed between end 38 of housing 28 and main body 68 of pop-up member 66.

Conveniently, pop-up member 66 and spring 76 are loaded into housing 28 through opposite end aperture 40 provided in end 38. To accomplish this, moving means 74 includes a plastic seal member 78 which sealingly closes opposite end aperture 40 to maintain the ambient pressure in central space 30. Seal member 78 is releasably held in place in opposite end aperture 40 by a suitable releasable seal means 80. Conveniently, releasable seal means 80 is similar to attaching means 60 and includes a split catch lip 81 which resiliently holds seal member 78 onto end 38 as shown. Obviously, other releasable seal means are also possible as well known to those of ordinary skill in the art.

Indicator 26 also includes a pressure responsive releasing means 82 located in side outlet 44. Releasing means 82 is used to initially hold pop-up member 66 in the non-signalling position and thereby to prevent movement of pop-up member 66 by moving means 74. In other words, releasing means 82 holds pop-up member 66 against the moving force or bias exerted by compressed spring 76. Then, when the suction pressure in intake portion 22 drops below a predetermined value, for example to a value where the suction pressure increase corresponds to a pressure drop across filter 12 of 5%, releasing means 82 releases pop-up member 66 so that moving means 74 by action of spring 76 moves pop-up member 66 from the non-signalling position to the signalling position.

In this preferred embodiment, releasing means 82 includes a seal means or pressure responsive member 84. Seal means 84 is preferably a plug member such as a round steel ball 86 which is located in bore 50 of side tube 46. Ball 86 is sized to fit movably in bore 50, but to substantially fill bore 50. Ball 50 is also sized to fit into catch portion 70 of pop-up member 66 when pop-up member 66 is in the non-signalling position. With ball 86 in place, it will be appreciated that ball 86 is subject to ambient air pressure on the side which faces central space 30 of housing 28 and to the suction pressure of intake portion 22 on the other side. Normally, ball 86 is held in place in catch portion 70 of pop-up member 66 by the resilient force of a biasing means 88. In the engaged position with catch portion 70, it will be appreciated that ball 86 prevents pop-up member from moving from the non-signalling position to the signalling position.

The holding force of biasing means 88 is sufficient to hold ball 86 in position despite the designed pressure difference between ambient air pressure in central space 30 and the suction pressure in intake portion 22. However, when filter 12 becomes sufficiently clogged and the suction pressure in intake portion 22 increases (drops), biasing means 88 is designed to give way to the increased pressure differential across ball 86 due to the increased suction pressure and thus to allow a releasing movement of ball 86 from catch portion 70. It will also be appreciated that after filter 12 is replaced, biasing means 88 also provides a bias to move ball 86 back into engagement with catch portion 70 when signal portion 72 is pushed back into housing 28 to reset indicator 26.

Biasing means 88 preferably includes a spring 90 and a plastic cap member 92 with a small aperture 94 therein. Small aperture 94 in cap member 92 assures that the suction pressure present in intake portion 22 is also present on the associated side of ball 86. Conveniently, cap member 92 held on free end 48 of side tube 46 by a releasable attaching means 96. Releasable attaching means 96 is formed by opposed arms 98 which catch on an outer lip 100 of free end 48 as shown.

In use, filter indicator system 10 requires that mounting aperture 24 first be provided (by design or with a drill or the like) in wall 14 at a position which is easily viewed and accessible from inside and outside of filter assembly 11. Once mounting aperture 24 is present, and indicator 26 is otherwise assembled except for locking collar 54, mounting collar 52 of housing 28 is passed from inside of filter assembly 11 through mounting aperture 24 in mounting wall 14. While indicator 26 is thus held in place, locking collar 54 is inserted through mounting wall 14 from outside of filter assembly 11 around signalling portion 72 of pop-up member 66 and inside of mounting collar 52 until catch lip 64 of locking collar 54 engages underneath of mounting collar 52. It will be appreciated that as both mounting collar 52 and locking Collar 54 are formed of a suitable resilient plastic material, the clearance between locking collar 54 and signalling portion 72 allows the insertion of locking collar 54 into mounting collar 52 and the locking of catch lip 64 after insertion. Once catch lip 64 catches below mounting collar 52, mounting wall 14 is snugly trapped between outer flange 56 of locking collar 54 and end wall 34 of housing 28; and indicator 26 is thus securely mounted inside of filter assembly 11. Obviously, for different thicknesses of mounting wall 14 both locking collar 54 and mounting collar 52 would have different heights. Demounting of indicator 26 is also possible either by breaking of locking collar 54 from outside of filter assembly 11 or pinching together of catch lip 64 (after removal of pop-up member 68 as discussed subsequently) from inside of filter assembly 11.

In operation, whenever a suction pressure is present in intake portion 22 of filter assembly 11, the suction pressure is also present on the associated side of ball 86 in side tube 46 by virtue of aperture 94 in cap member 92. As ball 86 substantially fills bore 50, ball 86 thus essentially seals bore 50 so that the other side of ball 86 is subject to the ambient air pressure from outside of filter assembly 11 which is transmitted into central space 30 via the clearance between signalling portion 72 and central aperture 58 in locking collar 54. Actually, some leakage about ball 86 will occur as ball 86 is mounted to allow axial movement in bore 50, but this leakage will be minor and easily compensated for (as noted subsequently). With the ambient air pressure on one side and the suction pressure on the other side, ball 86 is urged toward the suction pressure by the pressure differential across ball 86. Spring 90 in side tube 46 serves to counter this pressure differential so long as the suction pressure is above a predetermined value (or a predetermined value which has been compensated for by the expected leakage around ball 86). The predetermined value is selected as some value which is achieved when filter 12 becomes sufficiently clogged and replacement or cleaning is desirable.

When the predetermined value of suction pressure is reached or exceeded, the counter force offered by spring 90 is insufficient to counter the moving force of the pressure differential across ball 86. Ball 86 thus moves away from catch portion 70 of pop-up member 66 so that pop-up member 66 is no longer held in the non-signalling position. Thus, under action of spring 76, pop-up member 66 is moved toward end wall 34 and signalling portion 72 extends substantially beyond end inlet 36 and locking collar 54 to be easily viewed and serve as an indication that it is time to change filter 12.

After indicator 26 has signalled that filter 12 should be replaced by the extending of signalling portion 72 above end inlet 36 and filter 12 has been replaced, it will be appreciated that indicator 26 is easily reset to perform the same function again. This is accomplished simply by manually pushing down on the extended signalling portion 72. Initially, this causes ball 86, which is urged into engagement with the surface of the adjacent portion of main body 68 but which is still trapped in bore 50 by this engagement, to be pushed back into bore 50 as ball 86 rides along this surface. Thus, by pushing down until the free end of signalling portion 72 is flush with outer flange 56 of locking collar 54, main body 68 of pop-up member 66 is returned to the position where ball 86 is urged into catch portion 70 by spring 90. As the suction pressure in intake portion 22 is now above the predetermined value (by virtue of the new filter not causing a suction pressure below the predetermined value or the suction pressure not being exerted while filter assembly 11 is removed from the compressor and filter 12 is replaced), ball 86 thus holds pop-up member 66 in the non-signalling position once signalling portion 72 is manually released.

Whether mounted in filter assembly 11 or not, the various parts of indicator 26 are capable of being removed and maintained/cleaned or replaced as required. Preferably, this is accomplished by first removing cap member 92 by suitably pulling on cap member 92 to allow access to bore 50. Once cap member 92 is removed, both spring 90 and ball 86 can be removed. With cap member 92 removed, the biasing force of spring 90 is taken off of ball 86 so that pop-up member 68 can also be removed. Pop-up member 68 is removed by first pulling seal member 78 from end 38 of housing 28. This allows access to central space 30, and the easy removal of spring 76 and pop-up member 68. Reassembly preferably occurs in the reverse order.

While the present invention has been described with respect to exemplary embodiments thereof, it will be understood by those of ordinary skill in the art that variations and modifications can be effected within the scope and spirit of the invention.

We claim:

1. An indicator for signalling restricted flow of air through an air filter mounted in a filter assembly comprising:
    a housing including a central space, a side wall adjacent the central space, an end wall adjacent the central space, an end inlet in said end wall, and a side outlet in said side wall;
    a mounting means for mounting said end inlet of said housing to a mounting aperture in the filter assembly located downstream of the filter whereby said housing is mounted inside the filter assembly with said housing exposed to a suction pressure in the filter assembly which moves air through the filter;
    a pop-up member located in said central space of said housing, said pop-up member including a signal portion which extends adjacent said end inlet;
    a moving means for moving said pop-up member in said housing between a non-signalling position where said signal member does not extend noticeably through said end inlet and a signalling position where said signal portion extends noticeably through said end inlet and is easily viewed;
    a pressure responsive releasing means in said side outlet for initially holding said pop-up member in the non-signalling position and preventing movement by said moving means and for subsequently releasing said pop-up member when the suction pressure in the side outlet drops below a predetermined value relative to an ambient air pressure outside of the filter assembly.

2. An indicator as claimed in claim 1 wherein said releasing means includes:
    (a) a clearance between said signal portion and said end inlet whereby the central space of said housing is subject to the ambient air pressure outside of the filter assembly;
    (b) a seal means which fluidly restricts flow of air from the central space of the housing to said side outlet such that said seal means is subject to the ambient air pressure on one side thereof and the suction pressure on the other side thereof; and
    (c) a biasing means for biasing said seal means against movement, said biasing means allowing a releasing movement of said seal means when said suction pressure drops below the predetermined value and a resetting movement of said seal means when the suction pressure rises above the predetermined value.

3. An indicator as claimed in claim 2:
    wherein said side outlet of said housing includes a side tube extending away from said side wall of housing and fluidly connecting the central space of the housing with the suction pressure in the filter assembly;
    wherein said pop-up member includes a catch portion; and
    wherein said seal means in a plug member located in said side tube adjacent said catch portion of said pop-up member when said pop-up member is in the non-signalling position and which said plug member is biased into engagement with said catch portion by said biasing means to prevent movement of said housing to the signalling position.

4. An indicator as claimed in claim 3:
    wherein said plug member is a round ball; and
    wherein said side tube includes a cylindrical bore in which said ball is mounted for movement.

5. An indicator as claimed in claim 4 wherein said biasing means includes a spring, a cap member, a small aperture in said cap member, and a releasable attaching means for attaching said cap member to a free end of said side tube such that said spring and said ball are held in said cylindrical bore of said side tube by said end cap but are insertable and removable from said side tube upon removal of said end cap from the free end.

6. An indicator as claimed in claim 1 wherein said mounting means includes:
    (a) a mounting collar upstanding from said end wall which surrounds said end inlet and extends through the mounting aperture in a mounting wall of the filter assembly;
    (b) a locking collar which fits inside of said mounting collar, said locking collar including a central aperture through which said signalling portion extends and an outer flange extending away from said signalling portion and resting against the mounting wall; and
    (c) an attaching means for attaching said locking collar to said end wall of said housing so that the mounting wall is trapped between said outer flange of said locking collar and said end wall of said housing.

7. An indicator as claimed in claim 1:
    wherein said housing is cylindrical and said central space is defined by a cylindrical wall;
    wherein said pop-up member includes a main body which is cylindrical and closely adjacent the cylindrical wall of said housing such that said main body is coaxially mounted for guided movement in said central space, and a catch portion in said main body which is engaged by said releasing means; and
    wherein said signalling portion is cylindrical, coaxial with the main body, and extending from one end of said main body.

8. An indicator as claimed in claim 1:
    wherein said housing includes an end opposite to said end wall and an opposite end aperture in said end; and
    wherein said moving means includes a spring, a seal member and a releasable seal means for attaching said cap member in the opposite end aperture of said housing opposite to said end wall to seal the opposite end aperture and such that said spring is held in said housing with the spring compressed against said pop-up member by said end cap but said spring and pop-up member are insertable and removable from said housing upon removal of said end cap from the opposite end of said housing.

9. An indicator as claimed in claim 6:
    wherein said housing is cylindrical and said central space is defined by a cylindrical wall;
    wherein said pop-up member includes a main body which is cylindrical and closely adjacent the cylindrical wall of said housing such that said main body is coaxially mounted for guided movement in said central space, and a catch portion in said main body which is engaged by said releasing means; and wherein said signalling portion is cylindrical, coaxial with the main body, and extending from one end of said main body.

10. An indicator as claimed in claim 9:

wherein said housing includes an end opposite to said end wall and an opposite end aperture in said end; and wherein said moving means includes a spring, a seal member and a releasable seal means for attaching said cap member in the opposite end aperture of said housing opposite to said end wall to seal the opposite end aperture and such that said spring is held in said housing with the spring compressed against said pop-up member by said end cap but said spring and pop-up member are insertable and removable from said housing upon removal of said end cap from the opposite end of said housing.

11. An indicator as claimed in claim 5 wherein said mounting means includes:

(a) a mounting collar upstanding from said end wall which surrounds said end inlet and extends through the mounting aperture in a mounting wall of the filter assembly;

(b) a locking collar which fits inside of said mounting collar, said locking collar including a central aperture through which said signalling portion extends and an outer flange extending away from said signalling portion and resting against the mounting wall; and (c) an attaching means for attaching said locking collar to said end wall of said housing so that the mounting wall is trapped between said outer flange of said locking collar and said end wall of said housing.

12. An indicator as claimed in claim 11:

wherein said housing is cylindrical and said central space is defined by a cylindrical wall;

wherein said pop-up member includes a main body which is cylindrical and closely adjacent the cylindrical wall of said housing such that said main body is coaxially mounted for guided movement in said central space, and a catch portion in said main body which is engaged by said releasing means; and wherein said signalling portion is cylindrical, coaxial with the main body, and extending from one end of said main body.

13. An indicator as claimed in claim 12:

wherein said housing includes an end opposite to said end wall and an opposite end aperture in said end; and wherein said moving means includes a spring, a seal member and a releasable seal means for attaching said cap member in the opposite end aperture of said housing opposite to said end wall to seal the opposite end aperture and such that said spring is held in said housing with the spring compressed against said pop-up member by said end cap but said spring and pop-up member are insertable and removable from said housing upon removal of said end cap from the opposite end of said housing.

14. A filter indicator system for indicating restricted air flow comprising:

a filter assembly including a mounting wall, a filter, and a means for positioning said filter in said filter assembly so that air in an inlet portion of said filter assembly is drawn by a suction pressure through said filter to an intake portion of said filter assembly, and a mounting aperture in said mounting wall downstream of said filter; and an indicator for signalling a restricted flow of air through said air filter including:

(a) a hollow housing including a central space, a side wall, an end wall, an end inlet in said end wall, and a side outlet in said side wall;

(b) a mounting means for mounting said end inlet of said housing to said mounting aperture in said mounting wall whereby said housing is mounted inside said filter assembly with said housing exposed to the suction pressure in the filter assembly;

(c) a pop-up member located in the central space of said housing, said pop-up member including a signal portion which extends adjacent said end inlet to a position adjacent said mounting wall whereby said pop-up member and said central space are subject to an ambient pressure outside of said filter assembly and a catch portion;

(d) a moving means for moving said pop-up member in said housing between (a) a non-signalling position where said signal member does not extend noticeably through said end inlet and said mounting wall and (b) a signalling position where said signal portion extends noticeably through said end inlet and said mounting wall and is easily viewed outside of said filter assembly;

(e) a pressure responsive releasing means in said side outlet for initially holding said pop-up member in the non-signalling position and preventing movement by said moving means and for subsequently releasing said pop-up member when the suction pressure in the side outlet drops below a predetermined value, said releasing means including (a) a pressure responsive member located between said pop-up member and said side outlet which is subject to the suction pressure on one side through said side outlet and the ambient pressure in the central space, and (b) a biasing means for biasing said pressure responsive member into said catch portion of said pop-up member and for releasing said pressure responsive member from said catch portion when said suction pressure drops below a predetermined value relative to an ambient air pressure outside of the filter assembly.

15. A filter indicator system as claimed in claim 14 wherein said mounting means includes:

(a) a mounting collar upstanding from said end wall which surrounds said end inlet and extends through said mounting aperture in said mounting wall;

(b) a locking collar which fits inside of said mounting collar, said locking collar including a central aperture through which said signalling portion extends and an outer flange extending away from said signalling portion and resting against said mounting wall; and (c) an attaching means for attaching said locking collar to said end wall of said housing so that said mounting wall is trapped between said outer flange of said locking collar and said end wall of said housing.

16. A filter indicator system as claimed in claim 15:

wherein said housing includes an end opposite to said end wall and an opposite end aperture in said end; and wherein said moving means includes a spring, a seal member and a releasable seal means for attaching said cap member in the opposite end aperture of said housing opposite to said end wall to seal the opposite end aperture and such that said spring is held in said housing with the spring compressed against said pop-up member by said end cap but said spring and pop-up member are insertable and removable from said housing upon removal of said end cap from the opposite end of said housing.

17. A filter indicator system as claimed in claim 16:

wherein said side outlet of said housing includes a side tube extending away from said side wall of said housing and fluidly connecting the central space of the housing with the suction pressure in the filter assembly;

wherein said pressure responsive member is a plug member located in said side tube adjacent said catch portion of said pop-up member when said pop-up member is in the non-signalling position and which said plug member is biased into engagement with said catch portion by said biasing means to prevent movement of said housing to the signalling position; and wherein said biasing means includes a spring, a cap member, a small aperture in said cap member, and a releasable attaching means for attaching said cap member to a free end of said side tube such that said spring and said plug member are held in said cylindrical bore of said side tube by said end cap but are insertable and removable from said side tube upon removal of said end cap from the free end.

* * * * *